United States Patent
Shim et al.

(10) Patent No.: US 9,882,517 B2
(45) Date of Patent: Jan. 30, 2018

(54) METHOD AND SYSTEM FOR CONTROLLING MOTOR

(71) Applicants: Hyundai Motor Company, Seoul (KR); Kia Motors Corporation, Seoul (KR)

(72) Inventors: Dong Soo Shim, Chungcheongnam-do (KR); Jae Shin Yi, Gyeonggi-dio (KR); Byoung Hoon Choi, Gyeonggi-do (KR); Yeon Ho Kim, Gyeonggi-do (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 0 days.

(21) Appl. No.: 15/206,209

(22) Filed: Jul. 8, 2016

(65) Prior Publication Data

US 2017/0126154 A1    May 4, 2017

(30) Foreign Application Priority Data

Nov. 2, 2015  (KR) .................. 10-2015-0152982

(51) Int. Cl.
  *B60W 20/50*  (2016.01)
  *H02P 6/16*  (2016.01)
  *H02P 27/08*  (2006.01)

(52) U.S. Cl.
  CPC ............. *H02P 6/16* (2013.01); *B60W 20/50* (2013.01); *H02P 27/08* (2013.01); *B60W 2510/081* (2013.01)

(58) Field of Classification Search
  CPC ........ B60K 2006/268; B60K 2006/381; B60K 6/365; B60K 6/383; B60K 6/387;

(Continued)

(56) References Cited

U.S. PATENT DOCUMENTS 6,534,894 B1 * 3/2003 Flowerday ............. H02K 21/24
                                                         310/156.32
7,143,743 B2 * 12/2006 Uda ..................... F02D 9/1095
                                                         123/399

(Continued)

FOREIGN PATENT DOCUMENTS

JP    2009-524390 A    6/2009
KR   2008-0044561 A    5/2008

(Continued)

OTHER PUBLICATIONS

Kim, Sang-Hun et al., "A Study on Startup-Characteristic of Sensorless Controlled IPMSM Employing Sliding Mode Observer", English Abstract, pp. 38-43.

*Primary Examiner* — Rita Leykin
(74) *Attorney, Agent, or Firm* — Mintz Levin Cohn Ferris Glovsky and Popeo, P.C.; Peter F. Corless

(57) ABSTRACT

A method and a system for controlling a motor are provided to allow for a limp home function when an error occurs in a Hall effect sensor that detects the position of a rotor while operating a motor used for an automotive electric water pump. The method includes determining an output error of a Hall effect sensor and stopping adjustment a speed of the motor based on output of the Hall effect sensor, in response to detecting an output error of the Hall effect sensor. Additionally, the method includes adjusting the speed of the motor based on a counter electromotive force generated by a plurality of stator coils having different phases in the motor.

8 Claims, 2 Drawing Sheets

(58) Field of Classification Search
CPC ....... B60K 6/445; B60K 6/547; B60W 10/06;
B60W 10/08; B60W 10/10; B60W 20/30;
B60W 20/50; B60W 2510/08; B60W
2710/081; B60W 2710/1005; B60W
2510/081; B60Y 2200/92; H02P 6/16;
H02P 27/08
USPC .................................................. 318/400.09
See application file for complete search history.

(56) References Cited

U.S. PATENT DOCUMENTS

| | | | | |
|---|---|---|---|---|
| 7,382,107 B2* | 6/2008 | Hori | ........................ | F16H 61/32 |
| | | | | 318/432 |
| 7,458,362 B2* | 12/2008 | Hazama | ............. | F02M 37/0029 |
| | | | | 123/457 |
| 8,138,699 B2* | 3/2012 | Zhu | ........................ | H02K 21/24 |
| | | | | 318/400.01 |
| 8,222,789 B2* | 7/2012 | Zhu | .................... | B60L 11/1803 |
| | | | | 310/156.35 |
| 8,604,733 B2* | 12/2013 | Liegeois | ................. | H02M 7/49 |
| | | | | 318/400.01 |
| 9,312,798 B2* | 4/2016 | Pike | .......................... | H02P 6/12 |
| 2009/0240389 A1* | 9/2009 | Nomura | ................. | B62D 5/046 |
| | | | | 701/31.4 |
| 2014/0097777 A1* | 4/2014 | Leong | ...................... | G01P 3/44 |
| | | | | 318/430 |
| 2014/0333241 A1* | 11/2014 | Zhao | ....................... | H02P 21/06 |
| | | | | 318/400.02 |
| 2014/0340013 A1* | 11/2014 | Li | ........................... | H02K 3/28 |
| | | | | 318/400.26 |
| 2015/0137718 A1* | 5/2015 | Liu | ........................ | G01R 23/00 |
| | | | | 318/400.03 |
| 2016/0028334 A1* | 1/2016 | Greetham | ............... | H02P 27/16 |
| | | | | 318/400.27 |
| 2016/0094168 A1* | 3/2016 | Maekawa | ................. | B25F 5/00 |
| | | | | 318/400.06 |

FOREIGN PATENT DOCUMENTS

| | | |
|---|---|---|
| KR | 10-2011-0072885 A | 6/2011 |
| KR | 2011-0112995 A | 10/2011 |
| WO | 2007/083049 A2 | 7/2007 |

* cited by examiner

METHOD AND SYSTEM FOR CONTROLLING MOTOR

CROSS REFERENCE TO RELATED APPLICATION

The present application claims priority to Korean Patent Application No. 10-2015-0152982, filed Nov. 2, 2015, the entire contents of which is incorporated herein for all purposes by this reference.

BACKGROUND

Field of the Invention

The present invention relates to a method and a system for controlling a motor and, more particularly, to a method and a system for controlling a motor that allow for a limp home function when an error occurs by a Hall effect sensor for detecting the position during the process of controlling a motor that is used for an automotive electric water pump.

Description of the Related Art

In general, a 3-phase Brushless Direct Current (BLDC) motor is used in automotive electric water pumps. Further, a Hall effect sensor is generally used to operate the BLDC motors. The Hall effect sensor is a device configured to detect the position of a rotor, and three Hall effect sensors are arranged at 120° in a 3-phase BLDC motor and are configured to detect the positions of a rotor based on currents having phases provided to the 3-phase BLDC motor. The position information based on the current having the phases detected by the Hall effect sensors is output as voltages and the speed and torque of the motor are adjusted based on the voltages.

In the related art, when an error occurs in a method of controlling a motor using Hall effect sensors, as described above, the conventional method stopped the motor and output a warning. For example, in the related art, when an error is detected of a Hall effect sensor in a motor mounted in an automotive electric water pump, the electric water pump is stopped by stopping the motor, a Diagnosis Trouble Code (DTC) is recorded for the error of the Hall effect sensor, and a warning is output to the driver by turning on a service lamp on an instrument panel.

According to this control method of the related art, when an error is generated by a Hall effect sensor, an electric water pump is prevented from circulating cooling water thus preventing the vehicle from being be driven. Further, when a driver ignores or does not recognize a warning of an error of a Hall effect sensor and continues to drive the vehicle, the electronic devices may be damaged due to the increased temperature of the devices affected by the error.

The description provided above as a related art of the present invention is merely for helping understanding the background of the present invention and should not be construed as being included in the related art known by those skilled in the art.

SUMMARY

Accordingly, the present invention provides a method and a system for controlling a motor that allow for a limp home function without stopping a motor used for an automotive electric water pump when an error is generated by a Hall effect sensor configured to detect the position of a rotor in the motor in the process of controlling the motor.

According to one aspect of the present invention, a method of controlling a motor may include: determining an output error of a Hall effect sensor configured to detect a position of a rotor of a motor; stopping adjustment of a speed of the motor based on output of the Hall effect sensor, in response to determining an output error of the Hall effect sensor; and adjusting the speed of the motor based on a counter electromotive force generated by a plurality of stator coils having different phases in the motor.

When the output of the Hall effect sensor is the same for all phases of the motor, an error from the Hall effect sensor may be detected. Further, when the output from the Hall effect sensor is continuously the same over a predetermined number of times, an error from the Hall effect sensor may be detected. Additionally, the motor may be operated at a predetermined speed by providing predetermined polarities to a plurality of stator coils having different phases.

The method may further include: detecting a counter electromotive force of any one phase of phases of a plurality of coils in the motor; estimating a counter electromotive force of the other phases using the counter electromotive force detected in the counter electromotive force detection; and operating the motor based on the counter electromotive forces obtained in the counter electromotive force detection and the counter electromotive force estimation. The counter electromotive force detection may include detecting a counter electromotive force of a non-excited phase of the phases of the coils. Additionally, the counter electromotive force estimation may include estimating counter electromotive forces of the other coils using phase differences between the coil of which the counter electromotive force is detected and the other coils.

According to another aspect of the present invention, a system for controlling a motor may include: a brushless direct-current (DC) motor including a plurality of stator coils having different phases; an inverter configured to provide currents having different phases to the coils of the brushless DC motor; a plurality of Hall effect sensors configured to detect a position of a rotor of the brushless DC motor; a counter electromotive force detector configured to detect a counter electromotive force of at least one of the stator coils having different phases; and a motor controller configured to adjust a speed of the brushless DC motor based on the output from the Hall effect sensors when there is no output error of the Hall effect sensors, stopping the adjustment of the speed of the brushless DC motor based on the output from the Hall effect sensors in response to detecting an error from the Hall effect sensors, and adjusting the speed of the brushless DC motor based on the counter electromotive force detected by the counter electromotive force detector.

In response to detecting an error from the Hall effect sensors, the motor controller may be configured to stop adjusting the speed of the brushless DC motor based on output from the Hall effect sensors and may be configured to operate the motor at a predetermined speed by determining predetermined polarities for the stator coils having different phases. The counter electromotive force detector may be configured to detect a counter electromotive force of a non-excited phase of the phases of the coils, and the motor controller may be configured to estimate counter electromotive forces of the other coils using predetermined phase differences between the coil of which the counter electromotive force is detected and the other coils, and may be configured to operate the motor based on the counter electromotive force detected by the counter electromotive force detector and the estimated electromotive forces.

According to the method and the system for controlling a motor, when an error is generated by a Hall effect sensor for controlling a motor, it may be possible to switch control of the motor based on the counter electromotive forces generated at coils of the motor instead of stopping the motor. Accordingly, it may be possible to drive the vehicle to a repair shop without derating due to overheat/increased temperature of electronic parts/devices. Therefore, it may be possible to reduce inconvenience of a driver due when a vehicle cannot be driven due to an error of a Hall effect sensor and it may be possible to prevent additional costs of towing the vehicle.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

A method and a system for controlling a motor according to various exemplary embodiments of the present invention will be described hereafter with reference to the accompanying drawings.

Figure 1:
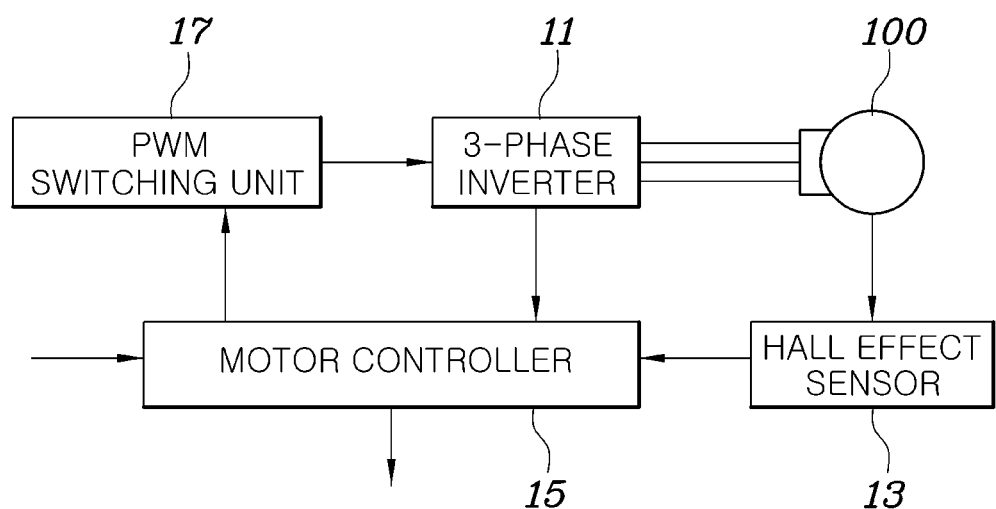
FIG. 1 is a block diagram illustrating a system for controlling a motor according to an exemplary embodiment of the present invention.

FIG. 1 is a block diagram illustrating a system for controlling a motor according to an exemplary embodiment of the present invention. Referring to FIG. 1, a system for controlling a motor according to an exemplary embodiment of the present invention may include a brushless DC motor 100, an inverter 11, a plurality of Hall effect sensors 13, and a counter electromotive force detector (not shown). The various elements of the system may be operated by a controller (e.g., a vehicle controller) having a processor and a memory.

The brushless DC motor 100, a motor used for an automotive electric water pump, may be operated by current having a plurality of phases. For example, a 3-phase brushless DC motor 100 may be operated by current of a U-phase, a V-phase, and a W-phase. The inverter 11 may be configured to receive DC power and then convert and output the DC power into alternating-current (AC) current having a plurality of phases using a switching device. The current having a plurality of phases output from the inverter 11 may be input as current to operate the motor 100. The inverter 11 may be configured to rotate a rotor in the motor 100 by repeatedly generating magnetic forces having opposite polarities between stator coils by periodically providing currents having different phases to the stator coils for the phases in the motor.

For example, a 3-phase motor may be configured to generate torque for a stator by generating magnetic forces in opposite directions through a U-phase coil, a V-phase coil, and a W-phase coil by periodically changing the polarities of the coils by providing currents having a phase difference of 120° to the coils. The switching by the inverter 11 is well known in the art, and thus a detailed description thereof has been omitted. Further, the Hall effect sensors 13, configured to detect the position of the rotor of the brushless DC motor 100, may be arranged at regular intervals around the rotor of the motor and may be configured to detect the position of the rotor. In other words, the Hall effect sensors 13 may be configured to detect the position of the rotor by generating hall voltage using a change in magnetic field by the rotor that is being rotated. The method of detecting a rotor of a motor using the Hall effect sensors 13 is also well known in the art, and thus a detailed description thereof has been omitted.

Moreover, the counter electromotive force detector (not shown) may be configured to detect the counter electromotive force of any one of coils of a plurality of phases. When the motor 100 is operated, counter electromotive force may be generated by a coil through which current does not flow, that is, a coil that is not excited in the stator coils having the phases in the motor 100. The counter electromotive force detector may be configured to detect counter electromotive force. Additionally, the counter electromotive force detector may be disposed on all of the phase coils to detect the counter electromotive force of the phase coils. In an exemplary embodiment of the present invention, the counter electromotive force detector may be provided for relatively short driving to a nearby repair shop, that is, a limp home function when an error is generated by a Hall effect sensor, and thus, the counter electromotive force detector may be disposed on one phase coil and the counter electromotive forces of the other phase coils may be estimated in consideration of the phase differences set in advance based on the number of phases. Calculation for this estimation may be performed by a motor controller 15.

When the Hall effect sensors 13 are operated normally (e.g., without error), the motor controller 15 may be configured to adjust the speed of the motor in accordance with position information of the rotor in the motor 100 detected by the Hall effect sensors 13. For example, the motor controller 15 may be configured to calculate the current motor speed based on the position information of the rotor, compare the current motor speed with an instructed motor speed from the outside, and determine the switching speed of the switching device of the inverter 11 to adjust the motor speed to correspond the instructed motor speed. The switching speed determined by the motor controller 15 may be provided to a PEM switching unit 17 and the PWM switching unit 17 may then be configured to output a signal for switching the switching device in the inverter 11 based on the input switching speed. The PWM switching unit 17 may be a common PWM driver.

Furthermore, the motor controller 15 may be configured to detect whether an output error is generated by the Hall effect sensors 13. When the motor controller 15 detects no error of the Hall effect sensors 13 (e.g., the sensors are operating without error), the motor controller 15 may be configured to operate the motor 100 based on the output from the Hall effect sensors 13. When the motor controller 15 detects an error from the Hall effect sensors 13, the motor controller 15 may be configured to terminate the adjustment of the speed of the motor 100 based on the Hall effect sensors and adjust the speed of the motor 100 based on the counter electromotive force detected by the counter electromotive force detector 13. The method of controlling a motor using the motor controller 15 will more clearly understood from the method of controlling a motor according to an exemplary embodiment of the present invention that will be described below.

Figure 2:
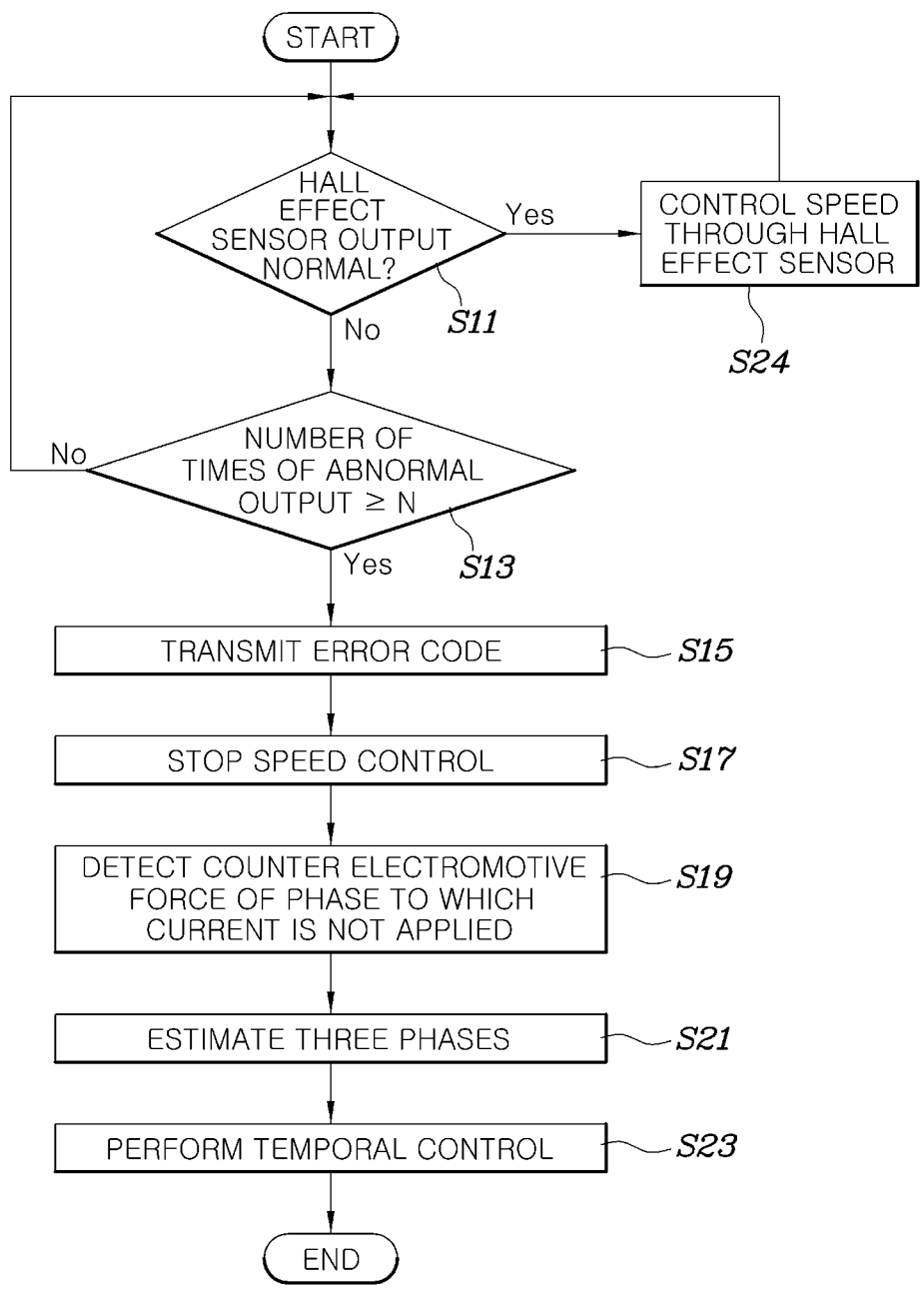
FIG. 2 is a flowchart illustrating a method of controlling a motor according to an exemplary embodiment of the present invention.

FIG. 2 is a flowchart illustrating a method of controlling a motor according to an exemplary embodiment of the present invention. Referring to FIG. 2, a method of controlling a motor according to an exemplary embodiment of the present invention may include: determining, by a controller, an output error of a Hall effect sensor 13 configured to detect the position of a rotor of a motor 100 (S11 and S13); stopping, by the controller, the speed of the motor based on the output of the Hall effect sensor 13 (S15 and S17) in response to detecting an output error of the Hall effect sensor 13; and adjusting, by the controller, the speed of the motor 100 based on a counter electromotive force generated by a plurality of stator coils having different phases in the motor 100 (S19, S21, and S23).

The steps of the method of controlling a motor according to an exemplary embodiment of the present invention may be executed by the motor controller 15 of the system for controlling a motor described above.

First, the motor controller 15 may be configured to execute the error detection process (S11 and S13) in which an output from the Hall effect sensor 13 is received with regular intervals and an error from the Hall effect sensor is detected based on the output. In general, in a plurality of Hall effect sensors 13 arranged at regular intervals in a motor including coils having a plurality of phases, at least one or more Hall effect sensors may show a high state and at least one or more Hall effect sensors may show a low state. Accordingly, when all of a plurality of Hall effect sensors 13 are in a high state or a low state, an error from the Hall effect sensors 13 may be detected. However, all of the Hall effect sensors 13 may be temporarily in a high or low state due to noise caused by the operation environment of the motor 100, and thus, in an exemplary embodiment of the present invention, when all of the output from the Hall effect sensors 13 are continuously in a high state or a low state over a predetermined number of times N, an error from the halls 13 may be detected (S13). That is, an incorrect error detection may be prevented by monitoring the high and low sates of the Hall effect sensors 13 for a predetermined period of time.

As described above, in response to determining that there is no error of the Hall effect sensors 13, motor control based on the output from the Hall effect sensors 13 may be performed (S24). In response to detecting an error from the Hall effect sensors 13, the motor controller 15 may be configured to terminate the adjustment of the motor speed based on the output from the Hall effect sensors 13. In the termination of the speed adjustment based on the output from the Hall effect sensors 13, the motor controller 15 may be configured to transmit an error code to another controller (e.g., the overall controller/vehicle controller) configured to operate a vehicle to record to error code and the overall controller may be configured to turn on a warning lamp on the instrument panel, etc. within a vehicle to provide a driver with a notification regarding an error from the Hall effect sensors.

Further, the motor generator 5 may be configured to operate the motor 100 at a predetermined speed by providing predetermined polarities to a plurality of stator coils having different phases in the motor 100 in S17. The control performed in the S17 is a type of open loop control, in which the motor controller 15 may be configured to determine the switching speed of the inverter 11 to cause the motor to have predetermined polarities of coils that correspond to the predetermined speed, and transmit the switching speed to the PWM switching unit 17. The predetermined speed of the motor 100 may be a motor speed suitable for motor control using a counter electromotive force that will be performed later.

Additionally, the motor controller 15 may be configured to execute the sensorless control on the motor 100 which may include: detecting a counter electromotive force of any one phase of the phases of a plurality of coils in the motor (S19); estimating a counter electromotive force of the other phases using the counter electromotive force detected in counter electromotive force detection (S21); and operating the motor based on the counter electromotive forces obtained in the counter electromotive force detection (S19) and the counter electromotive force estimation (S21). The detection of a counter electromotive force (S19) may be executed by a counter electromotive force detector configured to detect a counter electromotive force of a phase not excited of a plurality of coils in the motor 100, but is not shown in the figures.

In the estimation of a counter electromotive force (S21), it may be possible to estimate the counter electromotive forces of the other coils using predetermined phase differences between the coil when the counter electromotive force is detected by the counter electromotive force detector (not shown) and the other coils. For example, when the counter electromotive force detector (not shown) is disposed on the W-phase coil of 3-phase coils and detects the counter electromotive force of the W-phase coil, the motor controller 15 may be configured to detect the counter electromotive force waveform of the V-phase coil by adding a phase difference of 120° to the counter electromotive force waveform of the W-phase coil. Further, the motor controller 15 may be configured to detect the counter electromotive force waveform of the U-phase coil by subtracting a phase difference of 120° from the counter electromotive force waveform of the W-phase coil.

Finally, the motor controller 15 may be configured to operate the motor 100 (S23) based on the counter electromotive forces of the phases obtained in the detection of a counter electromotive force (S19) and the estimation of a counter electromotive force (S21). The speed control performed in the step S23 is closed loop control, in which, for example, a control method that detects a zero cross point of a counter electromotive force, which is made at each crossing of a counter electromotive force and the zero phases of common points of a plurality of coils of the motor 100, and that operates the inverter 11 so that current flow to the motor 100 may be used.

As described above, according to exemplary embodiments of the present invention, when an error is generated by a Hall effect sensor for controlling a motor, it may be possible to continuously operate the motor by switching control of the motor based on the counter electromotive forces generated at coils of the motor instead of stopping the motor. In particular, when an exemplary embodiment of the present invention is applied to an automotive electric water pump, even when an error is generated by a Hall effect sensor in a water pump motor, a vehicle is not required to be stopped and the driver may continue to drive the vehicle to a repair shop without derating due to overheat/increased temperature of electronic parts within the vehicle.

In particular, the method according to an exemplary embodiment of the present invention does not detect and adjust the counter electromotive forces of all coils having different phases in a motor to be applied to relatively short-distance driving for removing an error of a Hall effect sensor, but instead calculates the counter electromotive force of only one phase coil and estimates the counter electromotive forces of the other phase coils, to thus maximally suppress an increase in manufacturing cost and improve safety and convenience for a driver.

Although the present invention was described with reference to exemplary embodiments shown in the drawings, it is apparent to those skilled in the art that the present invention may be changed and modified in various ways without departing from the scope of the present invention, which is described in the following claims.

What is claimed is:

1. A method of controlling a motor, comprising:
   detecting, by a controller, an output error of a Hall effect sensor configured to detect a position of a rotor of a motor;
   stopping, by the controller, adjustment of a speed of the motor based on output of the Hall effect sensor, in response to detecting the output error of the Hall effect sensor; and
   adjusting, by the controller, the speed of the motor based on a counter electromotive force generated by a plurality of stator coils having different phases in the motor,
   wherein the step of adjusting includes:
      detecting, by the controller, a counter electromotive force of any one phase of the different phases of the plurality of stator coils in the motor;
      estimating, by the controller, a counter electromotive force of another of the different phases using the detected counter electromotive force; and
      operating, by the controller, the motor based on the detected counter electromotive force and the estimated counter electromotive force.

2. The method of claim 1, wherein when the output of the Hall effect sensor is the same for all phases of the motor, the output error of the Hall effect sensor is detected.

3. The method of claim 2, wherein when the output from the Hall effect sensor is continuously the same over a predetermined number of times, the output error of the Hall effect sensor is detected.

4. The method of claim 1, wherein the motor is operated at a predetermined speed by providing predetermined polarities to the plurality of stator coils having the different phases.

5. The method of claim 1, wherein the counter electromotive force detection includes detecting a counter electromotive force of a non-excited phase of the different phases of the stator coils.

6. The method of claim 5, wherein the counter electromotive force estimation includes estimating counter electromotive forces of other stator coils using phase differences between the stator coil of which the counter electromotive force is detected and the other stator coils.

7. A system for controlling a motor, comprising:
   a brushless direct-current (DC) motor including a plurality of stator coils having different phases;
   an inverter configured to provide currents having different phases to the stator coils of the brushless DC motor;
   a plurality of Hall effect sensors configured to detect a position of a rotor of the brushless DC motor;
   a counter electromotive force detector configured to detect a counter electromotive force of at least one of the stator coils having the different phases; and
   a motor controller configured to adjust a speed of the brushless DC motor based on the output from the Hall effect sensors in response to determining that no output error of the Hall effect sensors occurs, stopping adjustment of the speed of the brushless DC motor based on the output from the Hall effect sensors in response to detecting the output error from the Hall effect sensors, and adjusting the speed of the brushless DC motor based on the counter electromotive force detected by the counter electromotive force detector,
   wherein the counter electromotive force detector is configured to detect a counter electromotive force of a non-excited phase of the different phases of the stator coils, and the motor controller is configured to estimate counter electromotive forces of another of the stator coils using predetermined phase differences between the stator coil of which the counter electromotive force is detected and another of the stator coils, and operate the motor based on the counter electromotive force detected by the counter electromotive force detector and the estimated electromotive forces.

8. The system of claim 7, wherein in response to detecting the output error from the Hall effect sensors, the motor controller is configured to stop adjusting the speed of the brushless DC motor based on output from the Hall effect sensors and is configured to operate the motor at a predetermined speed by providing predetermined polarities to the stator coils having the different phases.

* * * * *